(12) United States Patent
Celik-Butler et al.

(10) Patent No.: US 8,034,006 B2
(45) Date of Patent: Oct. 11, 2011

(54) CARDIOPULMONARY RESUSCITATION SENSOR

(75) Inventors: Zeynep Celik-Butler, Colleyville, TX (US); John W. Priest, Dallas, TX (US); Carolyn L. Cason, Arlington, TX (US); Mary E. Mancini, Plano, TX (US); Kenneth George Morallee, Kent (GB); Helge Fossan, Stavanger (NO)

(73) Assignees: Board of Regents, The University of Texas System, Austin, TX (US); Laerdal Medical AS, Stavanger (NO)

( * ) Notice: Subject to any disclaimer, the term of this patent is extended or adjusted under 35 U.S.C. 154(b) by 986 days.

(21) Appl. No.: 11/764,174

(22) Filed: Jun. 15, 2007

(65) Prior Publication Data

US 2008/0312565 A1    Dec. 18, 2008

(51) Int. Cl.
*A61H 31/00*    (2006.01)
(52) U.S. Cl. .................. 601/41; 600/587; 340/539.12
(58) Field of Classification Search .............. 601/41, 601/43; 340/539.12; 600/587
See application file for complete search history.

(56) References Cited

U.S. PATENT DOCUMENTS

| | | | |
|---|---|---|---|
| 5,476,092 A | | 12/1995 | Karlis et al. |
| 5,665,249 A | * | 9/1997 | Burke et al. ............. 216/2 |
| 6,306,107 B1 | | 10/2001 | Myklebust et al. |
| 6,351,671 B1 | | 2/2002 | Myklebust et al. |
| 6,390,996 B1 | | 5/2002 | Halperin et al. |
| 6,858,016 B2 | | 2/2005 | Davaris et al. |
| 7,074,199 B2 | | 7/2006 | Halperin et al. |
| 7,108,665 B2 | | 9/2006 | Halperin et al. |
| 7,118,542 B2 | | 10/2006 | Palazzolo et al. |
| 7,122,014 B2 | | 10/2006 | Palazzolo et al. |
| 7,220,235 B2 | | 5/2007 | Geheb et al. |
| 7,295,871 B2 | | 11/2007 | Halperin et al. |
| 2002/0055694 A1 | | 5/2002 | Halperin et al. |
| 2002/0078954 A1 | | 6/2002 | Davaris et al. |
| 2002/0193711 A1 | | 12/2002 | Halperin et al. |
| 2004/0082888 A1 | | 4/2004 | Palazzolo et al. |

(Continued)

FOREIGN PATENT DOCUMENTS

EP    1 057 451    12/2000

(Continued)

OTHER PUBLICATIONS

European Search Report for 08450087.5 dated Sep. 4, 2008.

(Continued)

*Primary Examiner* — Max Hindenburg
*Assistant Examiner* — Renee Danega
(74) *Attorney, Agent, or Firm* — Chainey P. Singleton; Edwin S. Flores; Chalker Flores, LLP

(57) ABSTRACT

The present invention provides a CPR sensor that includes a thin and substantially flat flexible substrate having one or more sensor arrays, a power source, an output interface and a processor or analog circuit, all of which are disposed on the substantially flat flexible substrate. The substrate can be any shape (e.g., rectangular, circular, a polygon, an irregular shape that is decorative) and made from a polymer, metal film or other suitable material. Note that the substrate can be rigid or semi-flexible instead of flexible. A protective layer may cover the sensor array, the power source, and the processor or analog circuit. Alternatively, a protective covering can be used to encapsulate the device. The one or more sensor arrays measure one or more of the following compressions characteristics: compression depth, compression force, compression frequency and compression acceleration.

50 Claims, 7 Drawing Sheets

U.S. PATENT DOCUMENTS

| | | | |
|---|---|---|---|
| 2004/0210170 | A1 | 10/2004 | Palazzolo et al. |
| 2004/0210171 | A1 | 10/2004 | Palazzolo et al. |
| 2006/0009809 | A1 | 1/2006 | Marcovecchio et al. |
| 2006/0113537 | A1* | 6/2006 | Krulevitch et al. ............. 257/57 |
| 2006/0235320 | A1 | 10/2006 | Tan et al. |
| 2006/0247560 | A1 | 11/2006 | Halperin et al. |
| 2006/0270952 | A1* | 11/2006 | Freeman et al. ................ 601/41 |
| 2007/0010764 | A1 | 1/2007 | Palazzolo et al. |
| 2007/0100379 | A1 | 5/2007 | Tan et al. |
| 2007/0135739 | A1 | 6/2007 | Halperin et al. |
| 2007/0162076 | A1 | 7/2007 | Tan et al. |
| 2008/0171311 | A1* | 7/2008 | Centen et al. ................ 434/265 |

FOREIGN PATENT DOCUMENTS

| | | |
|---|---|---|
| WO | 2006/088373 | 8/2006 |
| WO | 2006/104977 | 10/2006 |

OTHER PUBLICATIONS

Celik-Butler, Z., et al., "Flexible Sensors: a Review," J. Nanoelectronics and Optoelectronics, (2006), 1:194-202.

Dayeh, S. A., et al., "Micromachined Infrared Bolometers on Flexible Polyimide Substrates," Sensors and Actuators (2005), AI18:49-56.

Mahmood, A., et al., "Flexible Microbolometers Promise Smart Fabrics with Imbedded Sensors," Laser Focus World, (2004) pp. 99-103.

Mahmood, A., et al., "Micromachined Bolometers on Polyimide," Sensors and Actuators A, (2006), 132:452-459.

Shamanna, V., et al., "Micromachined Integrated Pressure-Thermal Sensors on Flexible Substrates," Journal of Micromechanics and Microengineering (2006), 16:1984-1992.

Yaradanakul, A., et al., "Uncooled Infrared Microbolometers on a Flexible Substrate," IEEE Transactions on Electron Devices, (2002), 49:930-933.

Yildiz, A., et al., "Microbolometers on a Flexible Substrate for Infrared Detection," IEEE Sensors Journal, (2004), 4:112-117.

"Nano-Bio Interface," BIODFW Regional Alliance, Southwestern Medical Center, Dallas, TX (Apr. 20, 2006).

Self Packaged Flexible Electronics, IEEE-EDIS Distinguished Lecture, Tempe AZ (Jan. 13, 2006).

"Self-Packaged Flexible Electronics," NanoTX, Dallas Convention Center, Dallas TX (Sep. 28, 2006).

"Smart Skin," Mid-Cities Technical Club Meeting, Arlington, TX (Mar. 3, 2004).

"Smart Skin: Multifunctional Sensory Arrays on Flexible Substrates," Strategic Partnership for Research in Nanotechnology (SPRING) Workshop 11, University of Texas at Dallas, (Nov. 12, 2004).

"Smart Skin: Multisensory Arrays on Flexible Substrates," Freescale Semiconductor Co., Tempe, AZ (Jan. 13, 2006).

* cited by examiner

CARDIOPULMONARY RESUSCITATION SENSOR

CROSS-REFERENCE TO RELATED APPLICATIONS

This patent application is related to U.S. provisional patent application No. 60/944,479 filed on Jun. 15, 2007 and entitled "Thin Flexible Sensor" which is hereby incorporated by reference in its entirety.

FIELD OF THE INVENTION

The present invention relates generally to the field of sensors and, more particularly, to a cardiopulmonary resuscitation sensor.

BACKGROUND OF THE INVENTION

Cardiopulmonary Resuscitation (CPR) is an emergency procedure consisting of external cardiac massage and artificial respiration that constitutes the first treatment for a person who has collapsed, has no pulse and has stopped breathing. CPR treatment attempts to restore circulation of the blood and prevent death or brain damage due to lack of oxygen. Survival from cardiac arrest within 4 minutes of collapse is primarily dependent on rapid defibrillation, but thereafter maintaining coronary and cerebral perfusion of at least 25% of baseline is essential for survival. The only practical way of doing this outside of a hospital is by delivering external chest compressions of at least 4 cm at a rate of about 100 per minute. Extensive research currently ongoing has shown that chest compressions delivered by hand by experienced emergency medical service (EMS) responders are adequate only 40% of the time and there are long periods when no chest compressions are given (high "Hands-off Ratio"). It follows that the chest compressions delivery by hand by a lay responder are expected to be even more inadequate.

One of the biggest concerns in CPR is the lack of feedback to the lay first responder or professional resuscitator. There is a wealth of data flowing from researchers regarding the quality of CPR; the impact of real time feedback to rescuers; the relationship between the force applied to the chest and the depth of the resulting compression; and the clinical outcomes from improved CPR. Specifically, the amount of applied pressure, frequency and depth of chest compressions administered to the patient needs to be adequate for CPR to be successful. Although effective training and simulation manikins exist; small non-intrusive devices to provide real-time feedback to the resuscitator do not exist. This lack of real-time feedback during CPR removes the ability to adjust the stimuli (i.e., amount of applied pressure and frequency of chest compressions) to improve the effectiveness of the CPR.

Accordingly, there is a need for a non-intrusive, real-time, low cost, readily available feedback device to measure and assess administered pressure during CPR on real patients.

SUMMARY OF THE INVENTION

The present invention provides a CPR sensor that is compact and thin so as to be readily available and easily portable, self-contained and wireless, self-powered, semi-flexible, simple and easy to use within minimal instruction and provides real-time feedback to the CPR resuscitator or provider. Moreover, the present invention will directly impact the effectiveness of CPR administered by laypersons and professionals, strengthening the second link—fast and effective CPR—in the Chain of Survival, and thus potentially reduce the fatality risk in emergency situations. The CPR sensor, which can be easily carried in a wallet or other personal belonging or clothing so that it can be located quickly during an emergency, informs the CPR provider on the characteristics of the chest compression as they are being performed. In addition, the CPR sensor permits swift and correct positioning of the helper's hands during CPR, and provides clear and concise feedback.

For example, a first embodiment of a CPR sensor in accordance with the present invention includes a thin and substantially flat flexible substrate (e.g., polymer, metal film, etc.) having one or more sensor arrays, a power source, an output interface and a processor or analog circuit, all of which are disposed on the substantially flat flexible substrate. The substrate can be any shape (e.g., rectangular, circular, a polygon, an irregular shape that is decorative) and made from a polymer, metal film or other suitable material. Note that the substrate can be rigid or semi-flexible instead of flexible. A protective layer may cover the sensor array and power source. Alternatively, a protective covering can be used to encapsulate the device. The one or more sensor arrays measure one or more compression characteristics (e.g., depth, force, frequency, acceleration, etc.).

Similarly, as second embodiment of a CPR sensor in accordance with the present invention includes a thin and substantially flat flexible substrate (e.g., polymer, metal film, etc.) having one or more sensor arrays, a processor or analog circuit, a power source, a communications interface, a geographic locator (e.g., GPS receiver, wireless communications device or other wireless location device), an output interface and a data storage, all of which are disposed on the substantially flat flexible substrate. A protective layer covers the sensor array, processor or analog circuit, power source, communications interface, geographic locator, output interface and data storage. Alternatively, a protective covering can be used to encapsulate the device. The one or more sensor arrays measure one or more compression characteristics (e.g., depth, force, frequency, acceleration, etc.) and one or more operational parameters (e.g., physical contact with a CPR recipient, physical contact with a CPR provider, temperature of the CPR recipient, heartbeat of the CPR recipient, pulse of the CPR recipient, cardiac electrical activity of the CPR recipient, etc.). The processor or analog circuit is connected to the sensor array, power source, communications interface, geographic locator, output interface and data storage.

A third embodiment of a CPR sensor in accordance with the present invention includes an upper protective layer, a lower protective layer and a thin and substantially flat flexible substrate (e.g., polymer, metal film, etc.) disposed between the upper protective layer and the lower protective layer. In addition, one or more sensor arrays, a processor or an analog circuit, a power source and an output interface are disposed on the flexible substrate. The one or more sensor arrays measure one or more compression characteristics (e.g., depth, force, frequency, acceleration, etc.). The processor or analog circuit is connected to the sensor array, output interface and power source.

A fourth embodiment of a CPR sensor in accordance with the present invention includes any of the previously described embodiments encapsulated or integrated into a credit card, debit card, identification card or driver's license.

A fifth embodiment of a CPR sensor in accordance with the present invention includes any of the previously described embodiments integrated into or attached to a cellular phone, a personal data assistant, an audio and/or video playback device or other device likely to be carried by a person.

In addition, the present invention provides a method for manufacturing a CPR sensor by performing the following steps: passivating a silicon wafer; adding a polyimide layer to the wafer; creating one or more sensor arrays using a MEMS process wherein the sensor array(s) measure one or more compression characteristics (e.g., depth, force, frequency, acceleration, etc.); dicing the wafer to extract the individual dies/sensors; printing a circuit on a flexible substrate; applying a paste or epoxy to the flexible substrate to receive and secure the individual dies/sensors; placing the individual dies/sensors on the flexible substrate; placing the flexible substrate on a lower protective layer containing electrical interconnects and an output interface, a processor or an analog circuit, and a power source; securing the flexible substrate to the lower protective layer; placing and securing a upper protective layer to the flexible substrate and the lower protective layer to complete assembly of the CPR sensor.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

Figure 1:
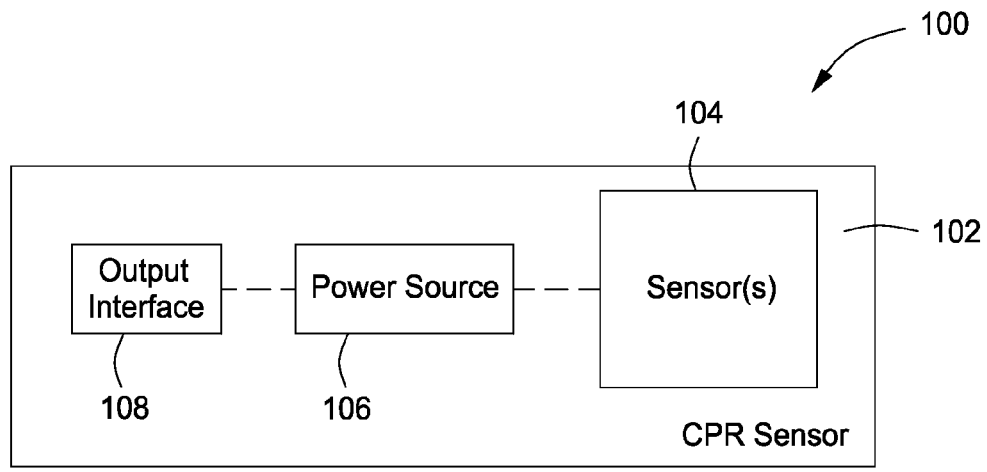
FIG. 1 is a block diagram of a CPR sensor in accordance with first embodiment of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to CPR sensors, but it will be understood that the concepts of the present invention are applicable to any thin form pressure, force, frequency and/or acceleration sensors.

The new Guidelines for First Aid co-developed by the American Red Cross and American Heart Association as well as the American Heart Association's CPR Guidelines were released on Nov. 28, 2005. According to these guidelines, the chest needs to be pushed down at least 4 centimeters and released between the nipples 30 consecutive times at the rate of 100 times per minute followed by two breaths. This procedure is to be repeated. The present invention measures the applied pressure and the acceleration by which the CPR is administered on the chest, from which the chest depression is to be calculated. In addition, the number of depressions and release actions is to be counted. If the procedure adheres to the specifications, a visual and/or audio feedback is provided to the responder. The procedure and the effectiveness can also be recorded on the strip to be downloaded and analyzed at a later date.

The CPR sensor is a low cost, very compact assembly of individual force and/or pressure, acceleration sensors, powering source (battery or energy harvesting with conditioning and storage electronics), biasing circuitry, read-out circuitry and necessary electrical connections. Individual sensors are fabricated on traditional non-flexible substrates (silicon). These individual sensors are then placed on a flexible printed circuit or a rigid card. The CPR sensor can be incorporated into portable emergency defibrillator equipment or can be used stand-alone. The market for the CPR sensor is every home or even having every adult person carrying a strip in his/her pocket for emergencies in various forms as part of a "Smart Card", a credit card or another form. Because of its revolutionary small size and low cost, it can be manufactured as part of a wallet, a pocket or part of any clothing. For public places like schools, airports, work-places, disposable versions can be stored with the emergency equipment. Flexible, disposable versions can be incorporated into public phones, cell phones or land-line home phones as removable strips when needed. CPR sensor can be incorporated into CPR training classes where manikins are used. In addition, it can be utilized in education and training classes for health professionals.

The present invention provides a CPR sensor that is compact and thin so as to be readily available and easily portable, self-contained and wireless, self-powered, semi-flexible, simple and easy to use within minimal instruction and provides real-time feedback to the CPR resuscitator or provider. Moreover, the present invention will directly impact the effectiveness of CPR administered by laypersons and professionals, strengthening the second link—fast and effective CPR—in the Chain of Survival, and thus potentially reduce the fatality risk in emergency situations. The CPR sensor, which can be easily carried in a wallet or other personal belonging or clothing so that it can be located quickly during an emergency, informs the CPR provider on the characteristics of the chest compression as they are being performed. In addition, the CPR sensor permits swift and correct positioning of the helper's hands during CPR, and provides clear and concise feedback.

Now referring to FIG. 1, a block diagram of a CPR sensor 100 in accordance with first embodiment of the present invention is shown. The CPR sensor 100 includes a thin and substantially flat flexible substrate 102 having one or more sensor arrays 104, a power source 106 and an output interface 108, all of which are disposed on the substantially flat flexible substrate 102. The substrate 102 can be any shape (e.g., rectangular, circular, a polygon, an irregular shape that is decorative) and made from a polymer, metal film or other suitable material. Note that the substrate 102 can be rigid or semi-flexible instead of flexible. If the substrate 102 is flexible or semi-flexible, it should be able to be stretched, wrinkled or flexed without degradation of the sensors 104. The one or more sensor arrays 104 measure one or more compression characteristics (e.g., depth, force, frequency, acceleration, etc.). The sensor array 104 and output interface 108 are connected to the power source 106.

A processor or analog circuit or logic circuit within or external to the sensor arrays 104 and/or output interface 108 determines whether one or more operational parameters are within one or more guidelines in order to provide feedback to the CPR provider indicating whether the operational parameters are within the guidelines via the output interface 108. The one or more operational parameters may include an applied pressure, an acceleration, a chest depression, a number of depressions, a number of release actions, a cardiac electrical activity or a combination thereof. The one or more sensors 104 may also detect a heart beat, pulse or cardiac electrical activity of a CPR recipient, a physical contact with a CPR recipient, a physical contact with a CPR provider or a temperature of the CPR recipient. The CPR recipient can be a human, an animal or a manikin. The CPR provider can be a human or a machine. The output interface 108 can be a visual display (e.g., light emitting diodes, liquid crystal displays or other visual display known to those skilled in the art), a speaker, a multi-tone generator, a communications interface or a combination thereof. The visual display can be a set of light emitting diodes that provide a feedback to the CPR provider, a status of the CPR sensor, a status of the CPR recipient or a combination thereof.

The power source 106 can be a battery, a solar panel, a layer of piezoelectric film or any type of energy harvesting technology for voltage generation during compressions, a cardiac electrical voltage generator or a combination thereof. Note that the battery 106 can be disposed on the flexible substrate 102 such that it is replaceable or rechargeable. The power source 106 can also be a combination of a battery along with one of the voltage generators connected to a power controller to manage power consumption and storage in the battery and the layer of piezoelectric film or other energy harvesting methods for voltage generation during compressions.

A protective layer (not shown) may cover the sensor array 104 and power source 108. A window or clear protective layer can be used to protect the output interface 108, yet still allow the output interface 108 to provide data, signals, indications and visual and/or audio signals. Alternatively, a protective covering can be used to encapsulate the device 100.

The CPR sensor 100 can be integrated in or attached to a manikin, a device, a business card, a credit card, a debit card, a membership card, a driver's license, an identification card, a wallet, a clothing or other thin portable user device. The device can be a defibrillator, a cellular phone, a mobile communications device, a personal data assistant, an audio and/or video playback device or other device likely to be carried by a person. The CPR sensor 100 can also be disposable for use by medical service providers in cases where they are not allowed to reuse such devices. The CPR sensor 100 may also include an adhesive layer dispose on a back exterior surface of the CPR sensor 100 and a sheet of removable protective material covering the adhesive layer so that the CPR sensor 100 will temporarily remain in place on the patient or manikin.

Figure 2:
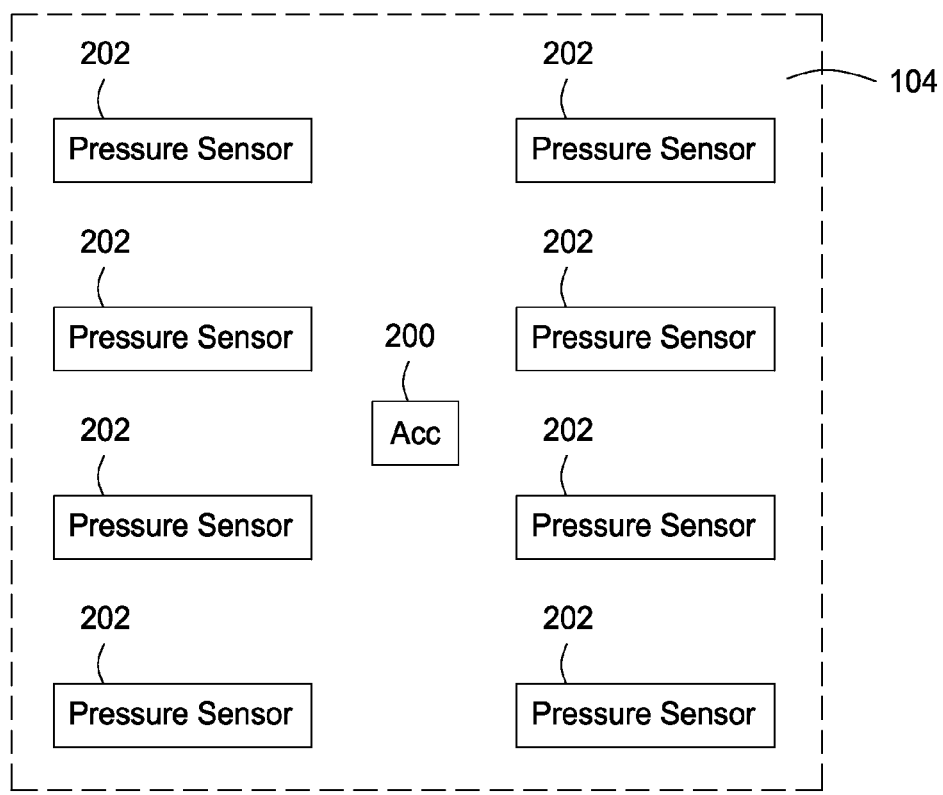
FIG. 2 is a block diagram of a sensor array to measure one or more compression characteristics in accordance with one embodiment of the present invention.

Referring now to FIG. 2, a block diagram of a sensor array 104 to measure compression depth, compression force, compression frequency and/or compression acceleration in accordance with one embodiment of the present invention is shown. The sensor array 104 can include one or more accelerometers 200 and one or more pressure sensors 202 positioned around the accelerometer 200. Other arrangement and numbers of individual sensors can be used.

Figure 3:
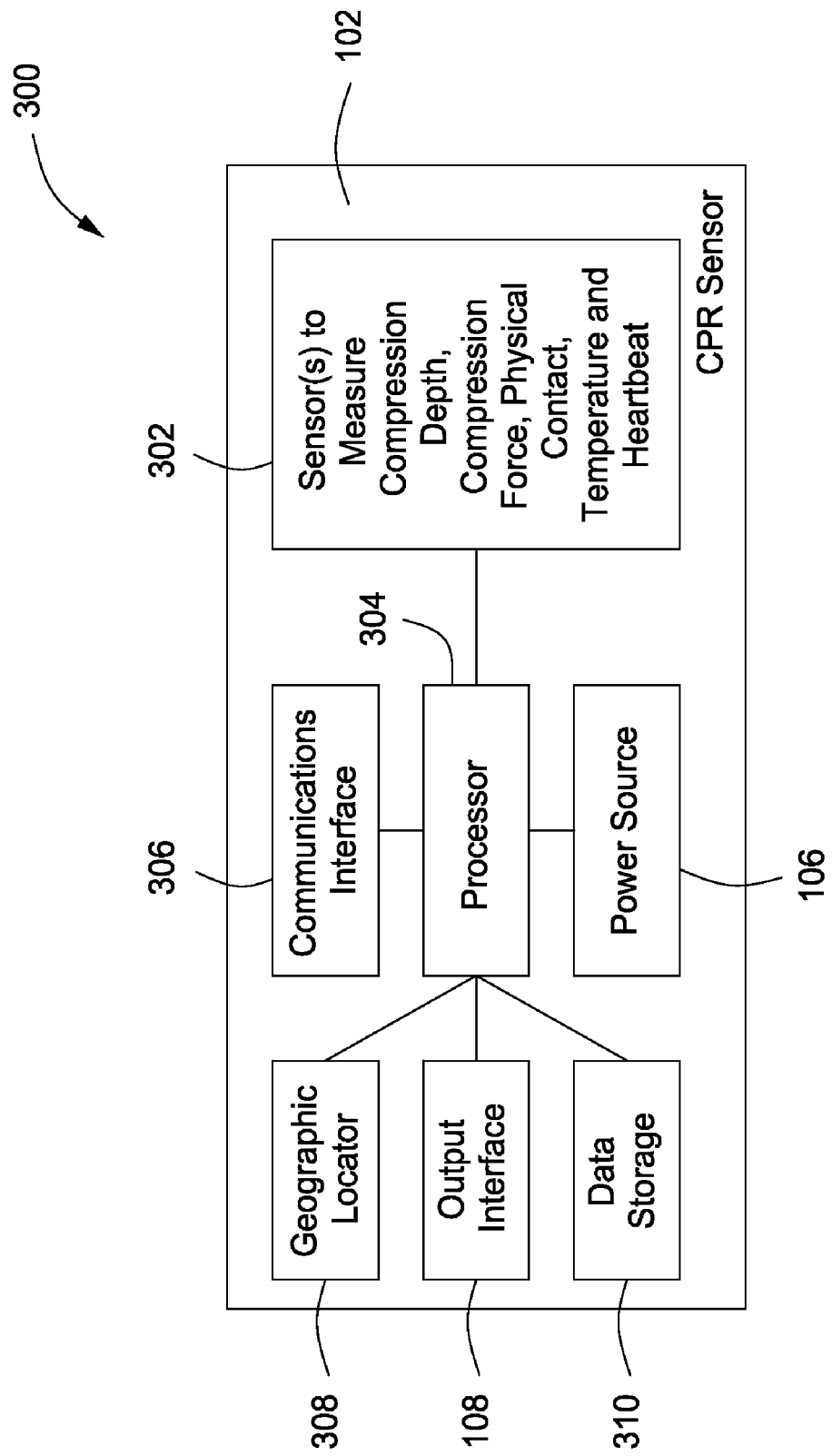
FIG. 3 is a block diagram of a CPR sensor in accordance with a second embodiment of the present invention.

Now referring to FIG. 3, a block diagram of a CPR sensor 300 in accordance with a second embodiment of the present invention is shown. The CPR sensor 300 includes a thin and substantially flat flexible substrate 102 having one or more sensor arrays 302, a processor or analog circuit 304, a power source 106, a communications interface 306, a geographic locator 308, an output interface 108 and a data storage 310, all of which are disposed on the substantially flat flexible substrate 102. The substrate 102 can be any shape (e.g., rectangular, circular, a polygon, an irregular shape that is decorative) and made from a polymer, metal film or other suitable material. Note that the substrate 102 can be rigid or semi-flexible instead of flexible. If the substrate 102 is flexible or semi-flexible, it should be able to be stretched, wrinkled or flexed without degradation of the sensors 302. The geographic locator can be a GPS receiver, wireless communications device or other wireless location device. A protective layer (not shown) covers the sensor array 302, processor or analog circuit 304, power source 106, communications interface 306, geographic locator 308, output interface 108 and data storage 310. A window or clear protective layer can be used to protect the output interface 108 and communications interface 306 (if necessary), yet still allow the output interface 108 and/or communications interface 306 to operate properly and as intended. Alternatively, a protective covering can be used to encapsulate the device 300. The one or more sensor arrays 302 measure one or more compression characteristics (e.g., depth, force, frequency, acceleration, etc.) and one or more operational parameters (e.g., physical contact with a CPR recipient, physical contact with a CPR provider, temperature of the CPR recipient, heartbeat of the CPR recipient, pulse of the CPR recipient, cardiac electrical activity of the CPR recipient, etc.). The processor or analog circuit 304 is connected to the sensor array 302, power source 106, communications interface 306, geographic locator 308, output interface 108 and data storage 310. The sensor array 302, communications interface 306, geographic locator 308, output interface 108 and data storage 310 may also be connected to the power source 106.

The processor or analog circuit 304 determines whether one or more operational parameters are within one or more guidelines in order to provide feedback to the CPR provider indicating whether the operational parameters are within the guidelines via the output interface 108. The one or more operational parameters may include an applied pressure, acceleration, a chest depression, a number of depressions, a number of release actions, cardiac electrical activity or a combination thereof. The CPR recipient can be a human, an animal or a manikin. The CPR provider can be a human or a machine. The output interface 108 can be a visual display (e.g., light emitting diodes, liquid crystal displays or other visual display known to those skilled in the art), a speaker, a multi-tone generator, a communications interface or a combination thereof. The visual display can be a set of light emitting diodes that provide a feedback to the CPR provider, a status of the CPR sensor, a status of the CPR recipient or a combination thereof. The visual display can also be a LCD/CRT-like display that provides interactive wireless communication between the provider and other support personnel.

The communications interface 306 can be an optical communications interface, an infrared communications interface, a wireless communications transceiver, a physical communications port or a combination thereof. The wireless transceiver can be a cellular phone, Internet communication, personal data assistant (PDA), an active radio frequency identification tag, a passive radio frequency identification tag, etc. The geographic locator 308 (e.g., GPS receiver, wireless communications device, etc.) can be used to determine a location of the CPR sensor 300. The processor or analog circuit 304 can periodically transmits a status of the CPR sensor 300, location of the CPR sensor 300, diagnostic information, a status of the CPR recipient or a combination thereof to a medical service provider via the communications interface 306. The processor or analog circuit 304 can receive instructions from medical service providers via the communications interface 306. The data storage 310 can be used to store the one or more parameters, the feedback, a status of the CPR sensor, diagnostic information or a combination thereof. The data storage 310 can be a RFID tag, a magnetic strip, a memory or a combination thereof The power source 106 can be a battery, a solar panel, a layer of piezoelectric film for voltage generation during compressions, an electromagnetic voltage generator or a combination thereof. Note that the battery 106 can be disposed on the flexible substrate 102 such that it is replaceable or rechargeable. The power source 106 can also be a combination The CPR sensor 300 can be integrated in or attached to a manikin, a device, a business card, a credit card, a debit card, a membership card, a driver's license, an identification card, a wallet, a clothing or other thin portable user device. The device can be a defibrillator, a phone, a mobile communications device or a personal data assistant. The CPR sensor 300 can also be disposable for use by medical service providers in cases where they are not allowed to reuse such devices. The CPR sensor 300 may also include an adhesive layer disposed on a back exterior surface of the CPR sensor 300 and a sheet of removable protective material covering the adhesive layer so that the CPR sensor 300 will temporarily remain in place on the patient or manikin.

Figure 4:
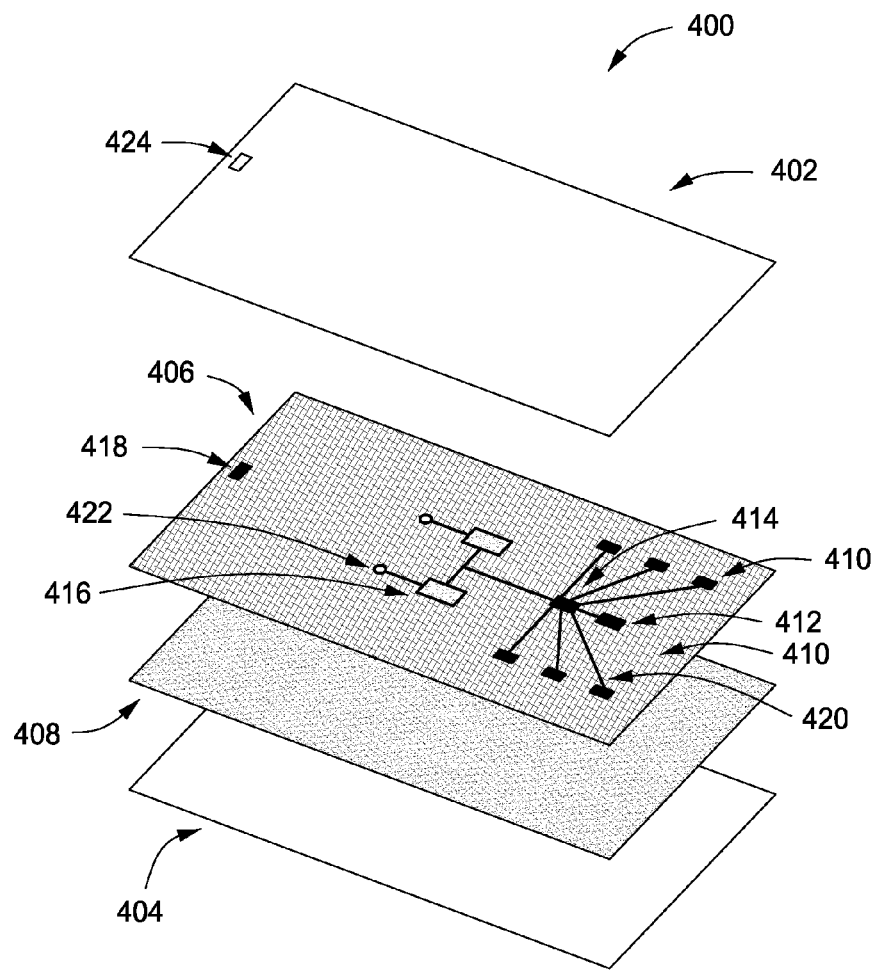
FIG. 4 is an exploded view of a CPR sensor in accordance with a third embodiment of the present invention.

Referring now to FIG. 4, an exploded view of a CPR sensor 400 in accordance with a third embodiment of the present invention is shown. The CPR sensor 400 includes an upper protective layer 402, a lower protective layer 404, a thin and substantially flat flexible substrate 406 and an energy producing layer 408 (e.g., a layer of piezoelectric film or other means for energy harvesting during compressions). The substrate 406 can be any shape (e.g., rectangular, circular, a polygon, an irregular shape that is decorative) and made from a polymer, metal film or other suitable material. The thin and substantially flat flexible substrate 406 and an energy producing layer 408 are both disposed between the upper protective layer 402 and the lower protective layer 404. The upper protective layer 402 and lower protective layer 404 are semi rigid plastic films, but other materials can also be used. Upper protective layer can also be made of a transparent or semi-transparent material. If the upper protective layer 402 is not transparent, upper protective layer 402 will include an opening or window 424 oriented above the output interface 418. The energy producing layer 408 can be a piezoelectric film or other means which generates a voltage in response to applied mechanical stress. During use, layer 408 is compressed and will start generating a voltage which will be applied to collecting means 416 in layer 406. The first compressions will not lead to a sufficiently high voltage to generate a visible signal, but after a short period of time the voltage will reach a sufficient level and feedback will be provided.

In addition, one or more sensor arrays (six force sensors 410 and one compression depth sensor 412), a signal processor 414, a power source 416 (energy collector and producer means) and an output interface 418 (e.g., light emitting diodes, liquid crystal displays or other visual display known to those skilled in the art) are disposed on or attached to the flexible substrate 406. The one or more sensor arrays 410 and 412 measure compression depth, compression force, compression frequency and/or compression acceleration and are typically implemented as MEMS (Micro-Electro-Mechanical Systems) sensors. The signal processor 414 is connected to the sensor array 410 and 412, output interface 418 and power source 416. The signal processor 414 compares the measured signals with threshold values and provides a feedback signal according to the results of the comparison to the output interface 418. This signal can be in the form of a series of lights corresponding to different compression depths and/or compression forces. The flexible substrate 406 also includes various leads 420 for connecting to other layers and components, and connections 422 to the energy producing layer 408. The output interface 418 displays different variables related to performance of CPR, such as compression depth, force, rate, etc.

Figure 5:
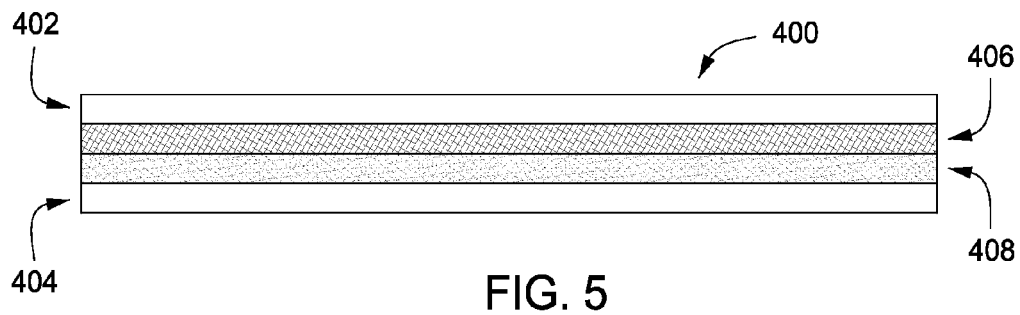
FIG. 5 is a sectional view of the CPR sensor in accordance with the third embodiment of the present invention.

Now referring to FIG. 5, a sectional view of the CPR sensor 400 in accordance with the third embodiment of the present invention is shown. The substantially flat body of the CPR sensor 400 has four layers including a thin and substantially flat flexible substrate 406 and an energy producing layer 408 disposed between the upper protective layer 402 and the lower protective layer 404. The substrate 406 can be any shape (e.g., rectangular, circular, a polygon, an irregular shape that is decorative) and made from a polymer, metal film or other suitable material. The flat body 400 in this embodiment has an approximate thickness of 1.25 mm. Note that it is possible to combine the middle layers 406 and 408 to reduce the number of layers to three.

Figure 6A:
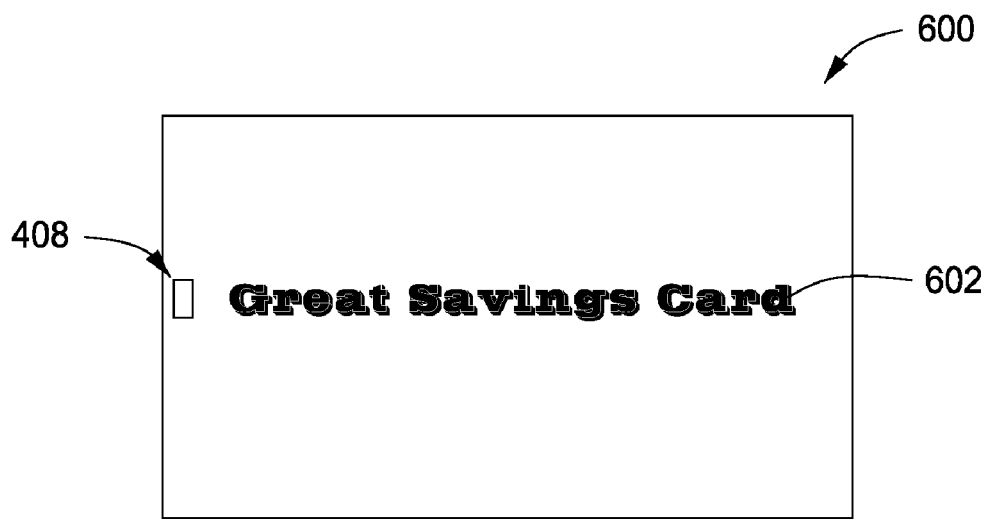
FIGS. 6A and 6B are top and bottom views respectively of a CPR sensor in accordance with a fourth embodiment of the present invention.
Figure 6B:
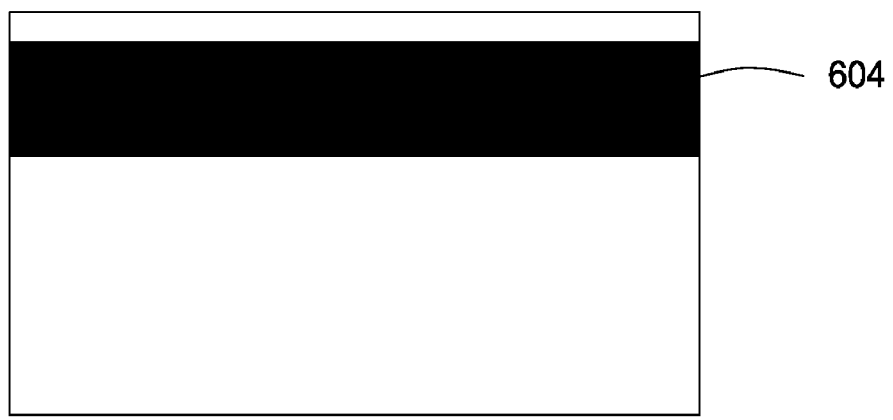

Referring now to FIGS. 6A and 6B, top and bottom views respectively of a CPR sensor 600 in accordance with a fourth embodiment of the present invention are shown. In this embodiment, the feedback device 600 is shaped as a card, such as a credit card, debit card, membership card, driving license or identification card, both in area and thickness whilst retaining the normal functions of such cards. FIG. 6A illustrates the opening or window 408 for the output interface and the possibility of providing the card with written information 602. As a supplementary feature the feedback device 600 can be equipped with a magnetic strip 604, which permits storage and exchange of information with suitable devices, and other information bearing devices common to traditional credit cards so that it can also function as a credit card. Note that signal processor 414 can be the processing unit in a conventional smart card.

Figure 7:
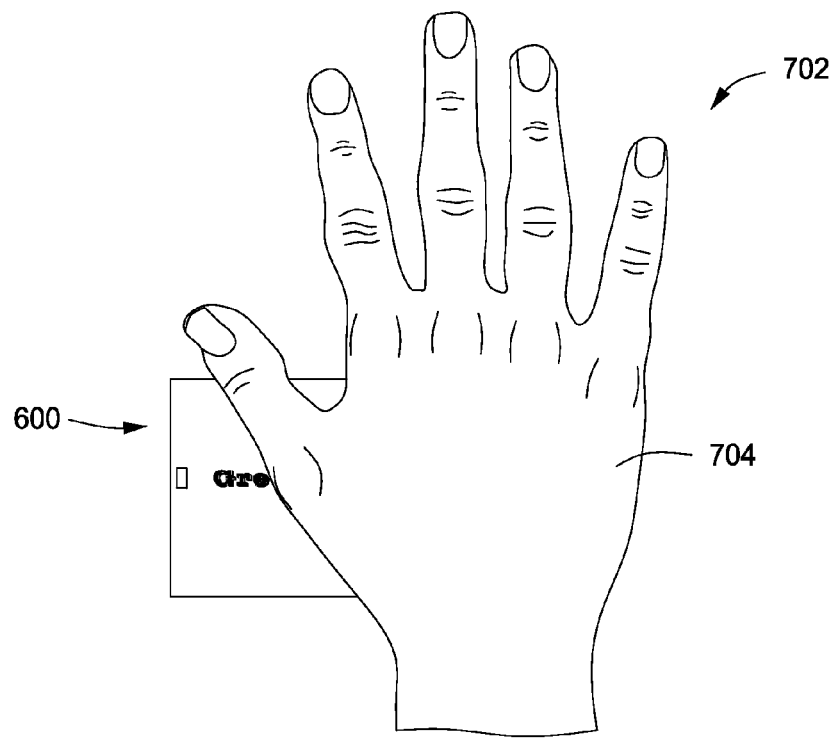
FIG. 7 illustrates an optimal position of a hand in relation to a CPR sensor in accordance with the fourth embodiment of the present invention.

Now referring to FIG. 7, an optimal position of a hand 702 in relation to a CPR sensor 600 in accordance with the fourth embodiment of the present invention is shown. Hand 702 is positioned with its middle line across the edge 704 of the device 600. Information on correct placement of the hand on the device can be available as text and/or drawings on the device 600.

Figure 8:
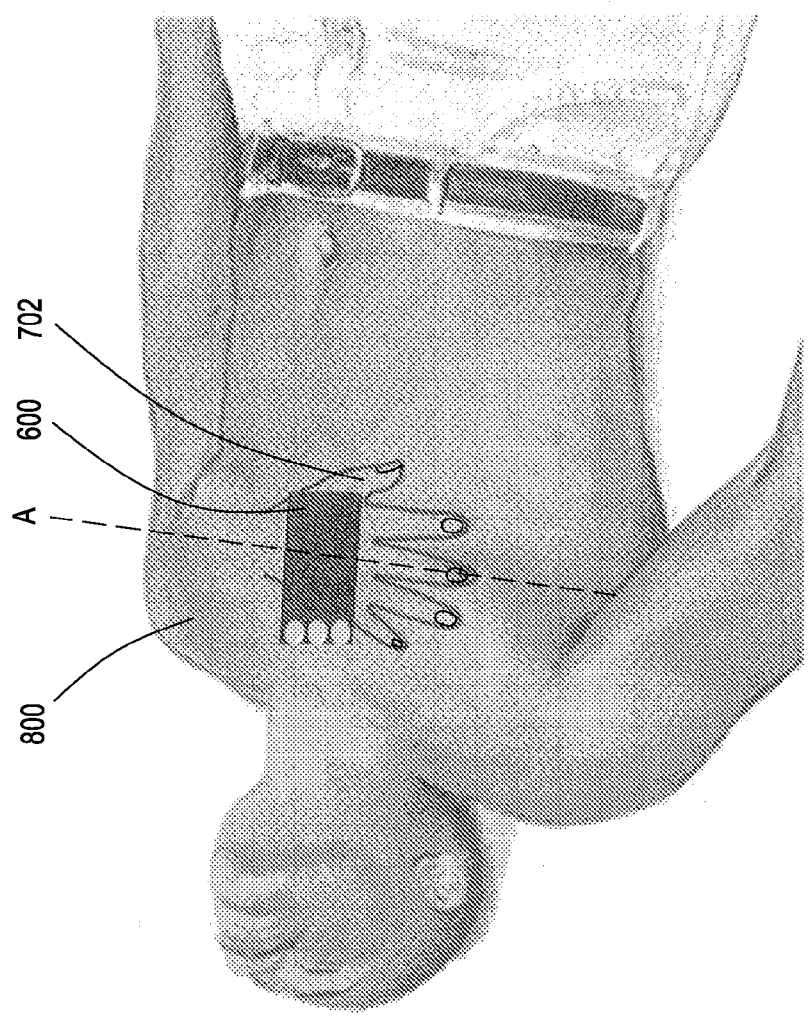
FIG. 8 illustrates an optimal position of a hand and a CPR sensor in relation to a patient's body in accordance with the fourth embodiment of the present invention.

Referring now to FIG. 8, an optimal position of a hand 702 and a CPR sensor 600 in relation to a patient's body 800 in accordance with the fourth embodiment of the present invention is shown. During use the device 600 will be placed on the patient's chest (with its edge on line A (nipple line) to mark the correct positioning of hand 702 on the patient's body 800) and chest compressions will be performed on the chest through the feedback device 600. Information on correct placement of the device 600 on the patient's chest can also be available as text and/or drawings on the device 600. The invention provides a simple way of ensuring correct positioning of the hand 702 when performing CPR. At the same time the display device 600 gives feedback on other parameters related to CPR.

Figure 9:
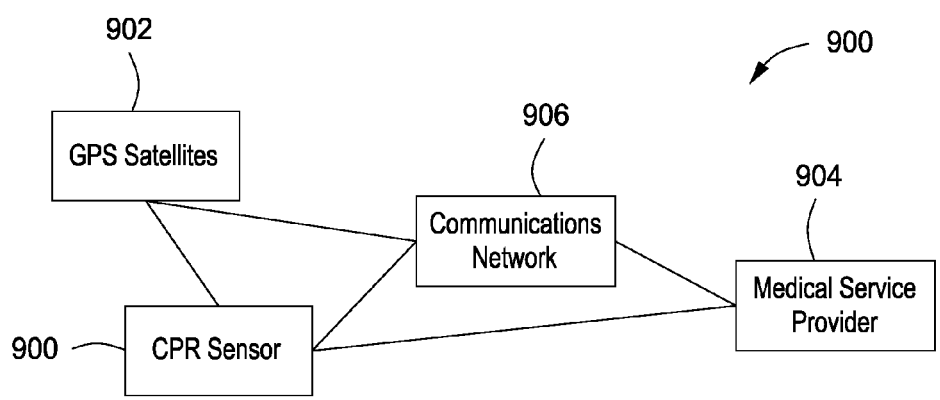
FIG. 9 is a block diagram of a system to communicate with a CPR sensor in accordance with one embodiment of the present invention.

Now referring to FIG. 9, a block diagram of a system 900 to communicate with a CPR sensor 300 in accordance with one embodiment of the present invention is shown. CPR sensor 300 receives signals from GPS satellites 902 via an internal GPS receiver (geographic locator) so that the position of the CPR sensor 300 can be determined. This information along with other desirable information regarding the status of the CPR sensor 300 and the CPR patient (recipient) can be transmitted (continuously or periodically) to a remote medical service provider 904 via a communications network 906 using an internal communications interface. The medical service provider 904 can be a doctor, 911 operator, emergency medical technician, ambulance, hospital, clinic, etc. The communications network 906 can be any type of wireless communications network or combination of wireless and landline network.

Figure 10:
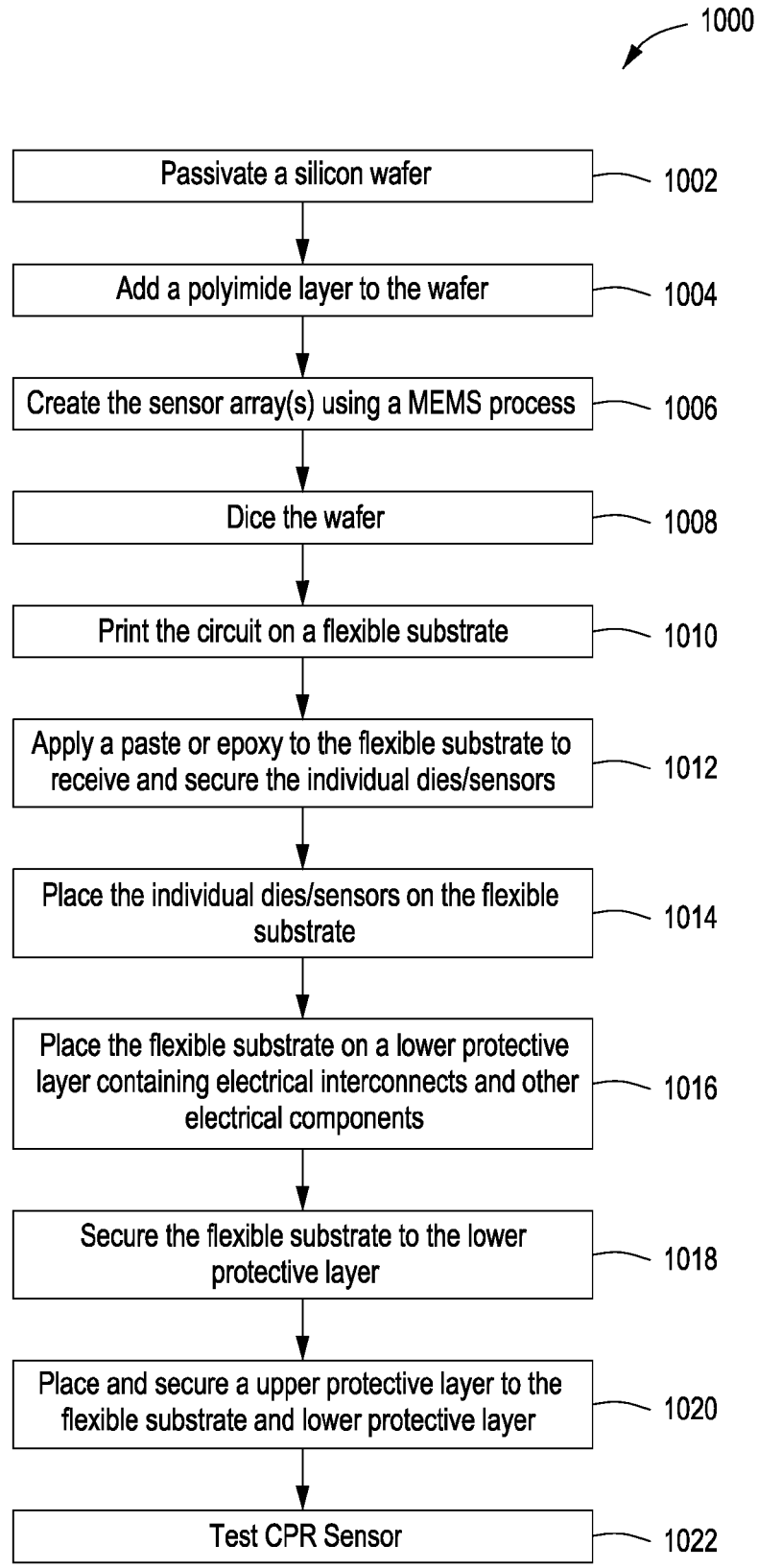
FIG. 10 is a flow chart of a manufacturing process to make a CPR sensor in accordance with the present invention.

Referring now to FIG. 10, a flow chart of a manufacturing process 1000 to make a CPR sensor in accordance with the present invention is shown. The method 1000 for manufacturing a CPR sensor includes the following steps: passivate a silicon wafer 1002; add a polyimide layer to the wafer 1004; create one or more sensor arrays using a MEMS process 1006 wherein the sensor array(s) measure compression depth, compression force, compression frequency and/or compression acceleration; dice the wafer to extract the individual dies/sensors 1008; print a circuit on a flexible substrate 1010; apply a paste or epoxy to the flexible substrate to receive and secure the individual dies/sensors 1012; place the individual dies/sensors on the flexible substrate 1014; place the flexible substrate on a lower protective layer containing electrical interconnects and an output interface, a processor or analog circuit and a power source 1016; secure the flexible substrate to the lower protective layer 1018; place and secure a upper protective layer to the flexible substrate and the lower protective layer to compete assembly of the CPR sensor 1020; and test the CPR sensor 1022.

REFERENCES

1. "Uncooled Infrared Microbolometers on a Flexible Substrate," A. Yaradanakul, D. P. Butler, and Z. Celik-Butler, IEEE Transactions on Electron Devices, vol. 49, pp. 930-933, 2002.
2. "Microbolometers on a Flexible Substrate for Infrared Detection," A. Yildiz, Z. Celik-Butler, D. P. Butler, IEEE Sensors Journal, vol. 4, pp. 112-117 (2004).
3. "Flexible Microbolometers Promise Smart Fabrics with Imbedded Sensors," A. Mahmood, D. P. Butler and Z. Celik-Butler, Laser Focus World, pp. 99-103 (April 2004).
4. "Micromachined Infrared Bolometers on Flexible Polyimide Substrates," S. A. Dayeh, D. P. Butler and Z. Celik-Butler, Sensors and Actuators vol. A118, pp. 49-56 (2005).
5. "Micromachined Integrated Pressure-Thermal Sensors on Flexible Substrates," V. Shamanna, S. Das, Z. Celik-Butler, D. P. Butler, and K. L. Lawrence, Journal of Micromechanics and Microengineering vol. 16, 1984-1992 (2006).
6. "Micromachined Bolometers on Polyimide," A. Mahmood, Z. Celik-Butler, and D. Butler, "Sensors and Actuators A, vol. 132, pp. 452-459 (2006).
7. "Flexible Sensors: a Review," Z. Celik-Butler and D. P. Butler, J. Nanoelectronics and Optoelectronics, vol. 1, pp. 194-202 (2006).
8. "Smart Skin," Mid-Cities Technical Club Meeting, Arlington, Tex. (Mar. 3, 2004).
9. "Smart Skin: Multifunctional Sensory Arrays on Flexible Substrates," Strategic Partnership for Research in Nanotechnology (SPRING) Workshop 11, University of Texas at Dallas, (Nov. 12 2004).
10. "Smart Skin: Multisensory Arrays on Flexible Substrates," Freescale Semiconductor Co., Tempe, Ariz. (Jan. 13, 2006).
11. "Self Packaged Flexible Electronics, IEEE-EDIS Distinguished Lecture, Tempe Ariz. (Jan. 13, 2006).
12. "Nano-Bio Interface," BIODFW Regional Alliance, Southwestern Medical Center, Dallas, Tex. (Apr. 20, 2006).
13. "Self-Packaged Flexible Electronics," NanoTX, Dallas Convention Center, Dallas Tex. (Sep. 28, 2006).

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware including a purely analog circuit, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

What is claimed is:

1. A cardiopulmonary resuscitation (CPR) sensor comprising:
   a card selected from the group consisting essentially of a business card, a credit card, a debit card, a membership card, a driver's license and an identification card;
   a thin and substantially flat flexible substrate encapsulated or integrated into the card;
   one or more sensor arrays disposed on the flexible substrate that measure one or more compression characteristics and one or more operational parameters;
   an output interface disposed on the flexible substrate that provides a feedback to a user;
   a processor or an analog circuit disposed on the flexible substrate and connected to the one or more sensor arrays and the output interface, wherein the processor or the analog circuit determines whether the measured operational parameters are within one or more CPR guidelines based on the measured compression characteristics and provides the feedback to the user regarding whether the measured operational parameters are within the CPR guidelines via the output interface;

a power source disposed on the flexible substrate and connected to the one or more sensor arrays, the output interface, and the processor or the analog circuit; and wherein the sensor is self-contained.

2. The CPR sensor as recited in claim 1, wherein:
the flexible substrate comprises a polymer or a metal film; and
the one or more compression characteristics comprise depth, force, frequency or acceleration.

3. The CPR sensor as recited in claim 1, further comprising a protective layer covering the sensor array(s), the processor or the analog circuit, and the power source.

4. The CPR sensor as recited in claim 1, wherein the sensor array(s) comprise:
one or more accelerometers; and
one or more pressure sensors positioned around the accelerometer(s).

5. The CPR sensor as recited in claim 1, wherein:
the one or more operational parameters comprise an applied pressure, an acceleration, a chest depression, a number of depressions, a number of release actions, and cardiac electrical activity or a combination thereof.

6. The CPR sensor as recited in claim 5, further comprising a data storage connected to the processor or the analog circuit that stores the one or more parameters, the feedback, a status of the CPR sensor, diagnostic information or a combination thereof.

7. The CPR sensor as recited in claim 6, wherein the data storage comprises a RFID tag, a magnetic strip, a memory or a combination thereof.

8. The CPR sensor as recited in claim 1, wherein the substrate is rigid or semi-flexible instead of flexible.

9. The CPR sensor as recited in claim 1, wherein the one or more operational parameters comprise a physical contact with a CPR recipient, a physical contact with a CPR provider, a temperature of the CPR recipient, a heartbeat of the CPR recipient, a pulse of the CPR recipient or a cardiac electrical activity of the CPR recipient.

10. The CPR sensor as recited in claim 9, wherein:
the CPR recipient is a human, an animal or a manikin; and
the CPR provider is a human or a machine.

11. The CPR sensor as recited in claim 1, wherein the output interface comprises a visual display, a speaker, a multi-tone generator, a communications interface or a combination thereof.

12. The CPR sensor as recited in claim 11, wherein the visual display comprises a set of light emitting diodes, a liquid crystal display or combination thereof that provide the feedback to the CPR provider, a status of the CPR sensor, a status of the CPR recipient or a combination thereof.

13. The CPR sensor as recited in claim 11, wherein the communications interface comprises an optical communications interface, an infrared communications interface, a wireless communications transceiver, a physical communications port or a combination thereof.

14. The CPR sensor as recited in claim 13, wherein the wireless transceiver comprises an active radio frequency identification tag, a passive radio frequency identification tag, a cellular phone, an Internet connection or a personal data assistant.

15. The CPR sensor as recited in claim 1, further comprising:
a geographic locator that is disposed on the flexible substrate and connected to the processor or the analog circuit; and
a communications interface disposed on the flexible substrate, connected to the processor or the analog circuit, wherein the processor or the analog circuit periodically transmits a status of the CPR sensor, a location of the CPR sensor as determined by the geographic locator, diagnostic information, a status of the CPR recipient or a combination thereof to a medical service provider via the communications interface.

16. The CPR sensor as recited in claim 1, wherein the flexible substrate can be stretched, wrinkled or flexed without degradation of the sensors.

17. The CPR sensor as recited in claim 1, wherein the CPR sensor is integrated in or attached to a manikin, a CPR recipient, a device, a wallet, a clothing or other thin portable user device.

18. The CPR sensor as recited in claim 17, wherein the device comprises a defibrillator, a phone, a mobile communications device, a cellular phone, an audio and/or video device or a personal data assistant.

19. The CPR sensor as recited in claim 1, wherein the CPR sensor is shaped, both in area and thickness, like a credit card.

20. The CPR sensor as recited in claim 1, wherein the power source comprises a battery, a solar panel, a layer of piezoelectric film for voltage generation during compressions that is used to recharge the battery, an electromagnetic voltage generator, an energy harvesting device or a combination thereof.

21. The CPR sensor as recited in claim 20, wherein the battery is replaceable or rechargeable.

22. The CPR sensor as recited in claim 1, wherein the power source comprises:
a battery;
a layer of piezoelectric film or other energy harvesting methods for voltage generation during compressions that is used to recharge the battery; and
a power controller to manage power consumption and storage in the battery and the layer of piezoelectric film for voltage generation during compressions.

23. The CPR sensor as recited in claim 1, wherein the CPR sensor is disposable.

24. The CPR sensor as recited in claim 1, further comprising:
an adhesive layer dispose on a back exterior surface of the CPR sensor; and
a sheet of removable protective material covering the adhesive layer.

25. The CPR sensor as recited in claim 1, further comprising a magnetic strip, a RFID tag, a wireless communications device or other information bearing device disposed on the exterior or interior of the CPR sensor.

26. A cardiopulmonary resuscitation (CPR) sensor comprising:
an upper protective layer;
a lower protective layer;
a thin and substantially flat flexible polymer or thin metal substrate disposed between the upper protective layer and the lower protective layer;
one or more sensor arrays disposed on the substrate that measure one or more operational parameters, and one or more compression characteristics selected from a group consisting of compression depth, compression force, compression frequency and compression acceleration;
an output interface disposed on the substrate that provides a feedback to a user;
a processor or an analog circuit disposed on the substrate and connected to the sensor array(s) and the output interface, wherein the processor or the analog circuit determines whether the measured operational parameters are within one or more CPR guidelines based on the measured compression characteristics and provides the feedback to the user regarding whether the measured operational parameters are within the CPR guidelines via the output interface;
a power source disposed on the substrate and connected to the processor or the analog circuit; and
wherein the sensor is self-contained and has a thickness of less than or equal to 2.0 mm.

27. The CPR sensor as recited in claim 26, wherein the upper protective layer and the lower protective layer encapsulate the substrate.

28. The CPR sensor as recited in claim 26, wherein the power source further comprises an energy producing layer disposed between the lower protective layer and the substrate.

29. The CPR sensor as recited in claim 26, wherein the sensor array(s) comprise:
one or more accelerometers; and
one or more pressure sensors positioned around the accelerometer(s).

30. The CPR sensor as recited in claim 26, wherein:
the one or more operational parameters comprise an applied pressure, an acceleration, a chest depression, a number of depressions, a number of release actions, a cardiac electrical activity or a combination thereof.

31. The CPR sensor as recited in claim 30, further comprising a data storage connected to the processor or the analog circuit that stores the one or more parameters, the feedback, a status of the CPR sensor, diagnostic information or a combination thereof.

32. The CPR sensor as recited in claim 31, wherein the data storage comprises a RFID tag, a magnetic strip, a memory or a combination thereof.

33. The CPR sensor as recited in claim 26, wherein the substrate is rigid or semi-flexible instead of flexible.

34. The CPR sensor as recited in claim 26, wherein the one or more operational parameters are selected from a group consisting of a physical contact with a CPR recipient, a physical contact with a CPR provider, a temperature of the CPR recipient, a heartbeat of the CPR recipient, a pulse of the CPR recipient or a cardiac electrical activity of the CPR recipient.

35. The CPR sensor as recited in claim 26, wherein the output interface comprises a visual display, a speaker, a multi-tone generator, a communications interface or a combination thereof.

36. The CPR sensor as recited in claim 35, wherein the visual display comprises a set of light emitting diodes, a liquid crystal display or a combination thereof that provide the feedback to the CPR provider, a status of the CPR sensor, a status of the CPR recipient or a combination thereof.

37. The CPR sensor as recited in claim 35, wherein the communications interface comprises an optical communications interface, an infrared communications interface, a wireless communications transceiver, a physical communications port or a combination thereof.

38. The CPR sensor as recited in claim 37, wherein the wireless transceiver comprises an active radio frequency identification tag, a passive radio frequency identification tag, a cellular phone, an Internet connection or a personal data assistant.

39. The CPR sensor as recited in claim 26, further comprising:
a geographic locator that is disposed on the flexible substrate and connected to the processor or the analog circuit; and
a communications interface disposed on the flexible substrate, connected to the processor or the analog circuit, wherein the processor or the analog circuit periodically transmits a status of the CPR sensor, a location of the CPR sensor as determined by the geographic locator, diagnostic information, a status of the CPR recipient or a combination thereof to a medical service provider via the communications interface.

40. The CPR sensor as recited in claim 26, wherein the flexible substrate can be stretched, wrinkled or flexed without degradation of the sensors.

41. The CPR sensor as recited in claim 26, wherein the CPR sensor is integrated in or attached to a manikin, a CPR recipient, a device, a business card, a credit card, a debit card, a membership card, a driver's license, an identification card, a wallet, a clothing or other thin portable user device.

42. The CPR sensor as recited in claim 41, wherein the device comprises a defibrillator, a phone, a mobile communications device, a cellular phone, an audio and/or video device or a personal data assistant.

43. The CPR sensor as recited in claim 26, wherein the CPR sensor is shaped, both in area and thickness, like a credit card.

44. The CPR sensor as recited in claim 26, wherein the power source comprises a battery, a solar panel, a layer of piezoelectric film for voltage generation during compressions that is used to recharge the battery, an electromagnetic voltage generator, an energy harvesting device or a combination thereof.

45. The CPR sensor as recited in claim 44, wherein the battery is replaceable or rechargeable.

46. The CPR sensor as recited in claim 26, wherein the power source comprises:
a battery;
a layer of piezoelectric film or other energy harvesting methods for voltage generation during compressions that is used to recharge the battery; and
a power controller to manage power consumption and storage in the battery and the layer of piezoelectric film for voltage generation during compressions.

47. The CPR sensor as recited in claim 26, further comprising:
an adhesive layer dispose on a back exterior surface of the CPR sensor; and
a sheet of removable protective material covering the adhesive layer.

48. The CPR sensor as recited in claim 26, further comprising a magnetic strip, a RFID tag, a wireless communications device or other information bearing device disposed on the exterior or interior of the CPR sensor.

49. A method of manufacturing a CPR sensor comprising the steps of:
passivating a silicon wafer;
adding a polyimide layer to the wafer;
creating one or more sensor arrays using a MEMS process wherein the sensor array(s) measures one or more operational parameters, compression depth and compression force;
dicing the wafer to extract the individual dies/sensors
printing a circuit on a flexible substrate;
applying a paste or epoxy to the flexible substrate to receive and secure the individual dies/sensors;
placing the individual dies/sensors on the flexible substrate;
placing the flexible substrate on a lower protective layer containing electrical interconnects and an output interface, a processor or an analog circuit, and a power source, and wherein the processor or the analog circuit is configured to determine whether the measured operational parameters are within one or more CPR guidelines based on the measured compression depth and measured compression force and provide a feedback to a user regarding whether the measured operational parameters are within the CPR guidelines via the output interface;
securing the flexible substrate to the lower protective layer;
placing and securing a upper protective layer to the flexible substrate and the lower protective layer to complete assembly of the CPR sensor; and
wherein the sensor is self-contained and has a thickness of less than or equal to 2.0 mm.

50. The method as recited in claim 49, further comprising the step of testing the CPR sensor.

* * * * *